United States Patent [19]

Clemens et al.

[11] 4,001,496
[45] Jan. 4, 1977

[54] DEFECT DETECTION AND COMPENSATION APPARATUS FOR USE IN AN FM SIGNAL TRANSLATING SYSTEM

[75] Inventors: Jon Kaufmann Clemens, Skillman; Jack Selig Fuhrer, Princeton Junction; Michael David Ross, Somerdale, all of N.J.

[73] Assignee: RCA Corporation, New York, N.Y.

[22] Filed: July 9, 1975

[21] Appl. No.: 594,429

Related U.S. Application Data

[63] Continuation of Ser. No. 477,102, June 6, 1974, abandoned.

[52] U.S. Cl. .............................. 358/127; 360/38; 358/128
[51] Int. Cl.$^2$ ..................... H04N 5/76; G11B 9/06
[58] Field of Search ....... 178/6.6 R, 6.6 DC, 6.7 A; 179/100.3 V, 100.4 M, 100.1 B, 100.4 R; 360/38; 358/8

[56] References Cited

UNITED STATES PATENTS

| 3,865,981 | 2/1975 | Welch | 360/38 |
| 3,912,858 | 10/1975 | Kenney | 360/38 |
| 3,925,811 | 12/1975 | Kenney | 358/8 |

OTHER PUBLICATIONS

Signal Processing in the Philips 'VLP' System, Van den Bussche et al., Philips Tech. Rev. 33, No. 7, pp. 181–185, 10/73.

*Primary Examiner*—Raymond F. Cardillo, Jr.
*Attorney, Agent, or Firm*—Eugene M. Whitacre; William H. Meagher

[57] ABSTRACT

In playback of a video record (e.g., in video disc form) employing a FM carrier recording format, a defect compensation system is provided which substitutes delayed video signals for current video signals when a defect is encountered. The current video signals are obtained from the output of the player's pickup-responsive FM detector (illustratively of the zero-crossing detector type) via appropriate frequency responsive circuitry comprising a low pass filter (encompassing the recorded video signal bandwidth: e.g., 0–3 MHz.). To detect the occurrence of a defect, the FM detector output is also supplied to additional frequency responsive circuitry having a wideband response which desirably extends from DC to an upper frequency limit (e.g., 0–6 MHz.) well above the highest frequency of the video signal subject to recording. The wideband circuit output is supplied to pair of voltage level comparators, one supplying an output pulse of a given polarity whenever the wideband circuit output voltage level exceeds a level representative of the FM detector output for the maximum frequency of the FM carrier deviation range employed in recording, and the other supplying an output pulse of the given polarity whenever the wideband circuit output voltage level falls below a level representative of the FM detector output for the deviation range's minimum frequency. The comparator outputs are added together to form a defect indication signal. Switching between current and delayed video signals is controlled in response to the defect indication signal. Operation in the delayed signal mode is maintained for a short period after defect indication pulse termination (to allow video circuitry stabilization following the defect transient) by rendering a retriggerable one-shot responsive to the defect indication signal, and combining the output of the one-shot with the defect indication signal to form the switching control signal.

14 Claims, 2 Drawing Figures

DEFECT DETECTION AND COMPENSATION APPARATUS FOR USE IN AN FM SIGNAL TRANSLATING SYSTEM

This application is a continuation of application Ser. No. 477,102, filed June 6, 1974 and now abandoned.

The present invention relates to novel defect compensation apparatus and methods suitable for use in playback of a video record employing an FM carrier recording format, and to novel defect defection apparatus and methods for use in effecting such defect compensation.

In the application of Jon K. Clemens, Ser. No. 126,772, filed Mar. 22, 1971, now U.S. Pat. No. 3,842,194, a video disc recording/playback system is disclosed in which recorded information appears in the form of geometric variations in the bottom of a spiral groove in the surface of a disc substrate covered by a conductive coating, with a dielectric layer overlying the conductive coating. A playback stylus, including a conductive electrode affixed to an insulating support, is received in the record groove. The stylus electrode cooperates with the disc coatings to form a capacitance which varies, as the disc is rotated, in accordance with the groove bottom geometry variations passing beneath the stylus electrode. Appropriate circuitry coupled to the stylus electrode translates the capacitance variations to electrical signal variations representative of the recorded information.

In a desirable form of the above-described capacitive video disc system, the recorded information comprises a carrier frequency modulated in accordance with video signals and appears in the form of successive groove bottom depth alternations between maximum and minimum depths. In use of such a FM carrier recording format, FM detector apparatus must be employed in the player to obtain video signals from the recovered FM signal.

Illustratively, the FM detector in the player may comprise a zero-crossing detector providing an output pulse of a standard width and amplitude in response to each zero-crossing of the input signal. The zero-crossing detector output is applied to a low-pass filter having a passband substantially matching the recorded video signal bandwidth to develop the desired video signals. For signal-to-noise considerations, video frequency pre-emphasis is desirably employed in the recording process, wherefore a complementary video frequency de-emphasis may be applied at an appropriate point in the subsequent processing of the video signals derived from the filtered output of the zero-crossing detector output.

In operation of a video disc player of the abovedescribed type to recover recorded video signals for image display purposes, a problem observable in the displayed picture is the intermittent appearance in random locations of disturbances in the form of white and/or black spots and streaks supplanting the appropriate picture information. These picture defects may vary in length, thickness and persistence of appearance. While not destructive of the picture information as a whole, the intermittent appearance of such picture defects can be a source of considerable annoyance to the viewer. The present invention is concerned with compensation methods and apparatus for substantially eliminating or significantly reducing the annoying effects of such picture defects.

An analysis of the problem has revealed that a variety of different causes may lead to the production of different ones of the annoying picture spots and streaks. Some of the causes may be associated with defects in the record itself. These causes may originate in various stages associated with the record production, and thus be traceable, for example, to spurious conditions associated with groove formation, groove bottom exposure, or groove bottom development steps in master preparation methods employing electron beam recording; or spurious conditions associated with various stages of the record replication processes or replica coating processes employed in forming the particular disc being played. Other causes may be associated with the conditions encountered in a particular playing of a given disc. Such causes may be associated, for example, with stylus encounters with debris of various forms in various regions of the disc groove. The debris may simply comprise dust particles, or it may be the result of erosion of stylus or disc and comprise particles of the conductive or dielectric materials employed in these elements. The debris problems are subject to change with successive plays of a disc as the stylus-debris encounters may have various effects on the debris: e.g., dislocation or fragmentation of the encountered particles; embedment of the particles in the groove surfaces; wear of embedded particles, etc.

Other causes may be associated with the past history of use of abuse of the disc being played. Such causes may involve mechanical alterations of the disc surfce: e.g., scratches, chips or dents; or they may involve chemical alterations of the disc surface, associated, for example, with the effects of fingerprints on the disc coatings.

Without further detailing of the causes of the picture defects, it should be clear that there are myraid causes of differing types which result in the problem having a high degree of unpredictability, and varying from disc to disc, play to play, groove region to groove region, etc.

In the magnetic video tape recording art, a well known technique for compensation of a particular form of picture defect (known as a "dropout") exists, and involves the substitution of information from a preceding television line of the displayed image when a "dropout" condition occurs. The "dropout" constitutes of a momentary loss, or significant reduction in amplitude, of the signal recovered by the playback head. With the recorded signal conventionally in FM carrier form, the dropout is detected by apparatus monitoring the pickup signal amplitude and responding to an amplitude drop below some preset minimum value which persists beyond some minimum duration period.

While it might appear that the above-described dropout detection and compensation techniques should provide a satisfactory solution to the picture defect problems of the previously discussed video disc playback system, this is not so in practice. A principal reason for this resides in the fact that while some of the picture defects in the video disc playback system may arise from signal defects of a "dropout" character, many of them do not, and are rather associated with signal defects of a contrary character that may approprately be termed "drop-in". That is, many of the picture defects arise from causes that augment or otherwise alter the signal in a manner that does not cause a detectible reduction of the input signal amplitude, but spuriously alters the repetition rate of zero crossings (e.g., introducing extra zero crossings, or missing zero crossings). The result of extra zero crossings or missing zero crossings appears as an abrupt change in frequency toward and usually beyond one of the deviation range frequency limits. This appears in the video output signal of the FM detector filter as a shift to an extreme white or black level. Moreover, due to the limited frequency response of the filter, the spurious shift (and subsequent return to normal) is stretched in time relative to the actual duration of the spurious condition in the input FM signal. Additionally, ringing effects associated with reactive elements of the filter are likely to persist in disturbing the output video signal for at least a short period following termination of the spurious input signal condition.

It is the concern of the present invention to provide compensation for picture defects of both "dropout" and "drop-in" character, and to this end a defect detection approach is employed that differs markedly from the "dropout" detection approach described above.

The defect detection approach of the present invention is based upon several well-grounded premises. First, it is recognized that the instantaneous carrier frequency of the FM signal input to the player's FM detector is shifted by desired signal information only within known, fixed limits (i.e., the deviation range employed in recording), wherefore shifts to frequencies beyond such limits are due not to desired signal information but to spurious, defective signal development of delivery conditions. Second, it is observed that essentially all of the noticeable, troublesome picture defects (of the black and/or white streak or spot type discussed previously) stem from input signal defects (independent of their causes) that shift the apparent instantaneous carrier frequency well beyond the known deviation range limits.

Defect detection pursuant to the principles of the present invention relies upon comparison of the instantaneous level of a video signal developed from an output of the player's FM detector with maximum and minimum levels corresponding to, or closely related to, the instantaneous video signals levels that are produced by that FM detector in response to input signal frequencies at the deviation range limits. Pursuant to an advantageous feature of the present invention, which enhances the ability of the detector to clearly and quickly recognize the onset of a defect, the input of the level comparators is not the video signal output of the FM detector used for image display purposes (which output is normally lowpass filtered and subsequently subject to video frequency de-emphasis in a manner strongly attenuating frequency components above the recorded video signal bandwidth), but rather is an output developed by a separate defect detector input filter in the form of a low pass filter having a cutoff frequency well above the highest recorded video signal frequency. Desirably, no video frequency deemphasis circuitry is associated with the defect detector input filter. Also for accuracy of the level comparison, it is preferable that the input to the level comparators include the DC component of the recovered video signal. For this reason, the defect detector input filter should be capable of passing DC (reliance upon DC restoration at the level comparator inputs being a possible, but less desirable alternative).

When a signal defect causes the input frequency to the player's FM detector to rise above the deviation range's upper limit, the voltage level at the output of the defect detector input filter rises to a level above a high level comparator threshold, initiating a defect indication pulse in the comparator output. With use for the player's FM detector of a zero-crossing type detector exhibiting a linear response to input frequencies over a wide band exceeding the recorded signal deviation range, the filter output level will remain above the high level comparator threshold until the input frequency drops within the deviation range limits, whereupon the defect indication pulse terminates. A similar development of a defect indication pulse is provided by a low level comparator whenever a signal defect causes the input frequency to drop below the deviation range's lower limit, thereby shifting the filter output level beyond the low level comparator threshold.

The defect indication pulses obtained from the comparators provide highly accurate indications of the intervals occupied by those input signal defects that engender the troublesome picture defects previously discussed. The wideband response of the defect detector input filter ensures that the defect indication pulses give an early indication of the onset of the defect.

The defect indication pulses are used to control switching of the player from a normal operating mode to a defect compensation mode. In the latter mode, a delayed signal constituting information from a preceding image line is used, in substitution for the current video signal output of the FM detector, to develop the player output signal. Because of the general redundancy of information in successive image lines, the preceding line information substitution serves to mask the defect occurrence, rendering it relatively unnoticeable to the image viewer.

Because of the differences in responses of the defect detector input filter and the main video signal output filter the termination of the signal disturbance in the output of the latter filter may be expected to lag the termination of the associated defect indication pulse developed by the level comparators. Accordingly there is associated with the player mode switching apparatus suitable means for effectively "stretching" the effect of the defect indication pulses so as to maintain the substitution mode until the current signal output of the FM detector is free of the disturbances that cause defective image display. An illustrative form of such "stretching" means supplements the defect indication pulses with the output of a retriggerable one-shot responsive to the defect indication pulses.

Objects and advantages of the present invention will be readily recognized by those skilled in the art upon a reading of the following detailed description and an inspection of the accompanying drawings in which.

Figure 1:
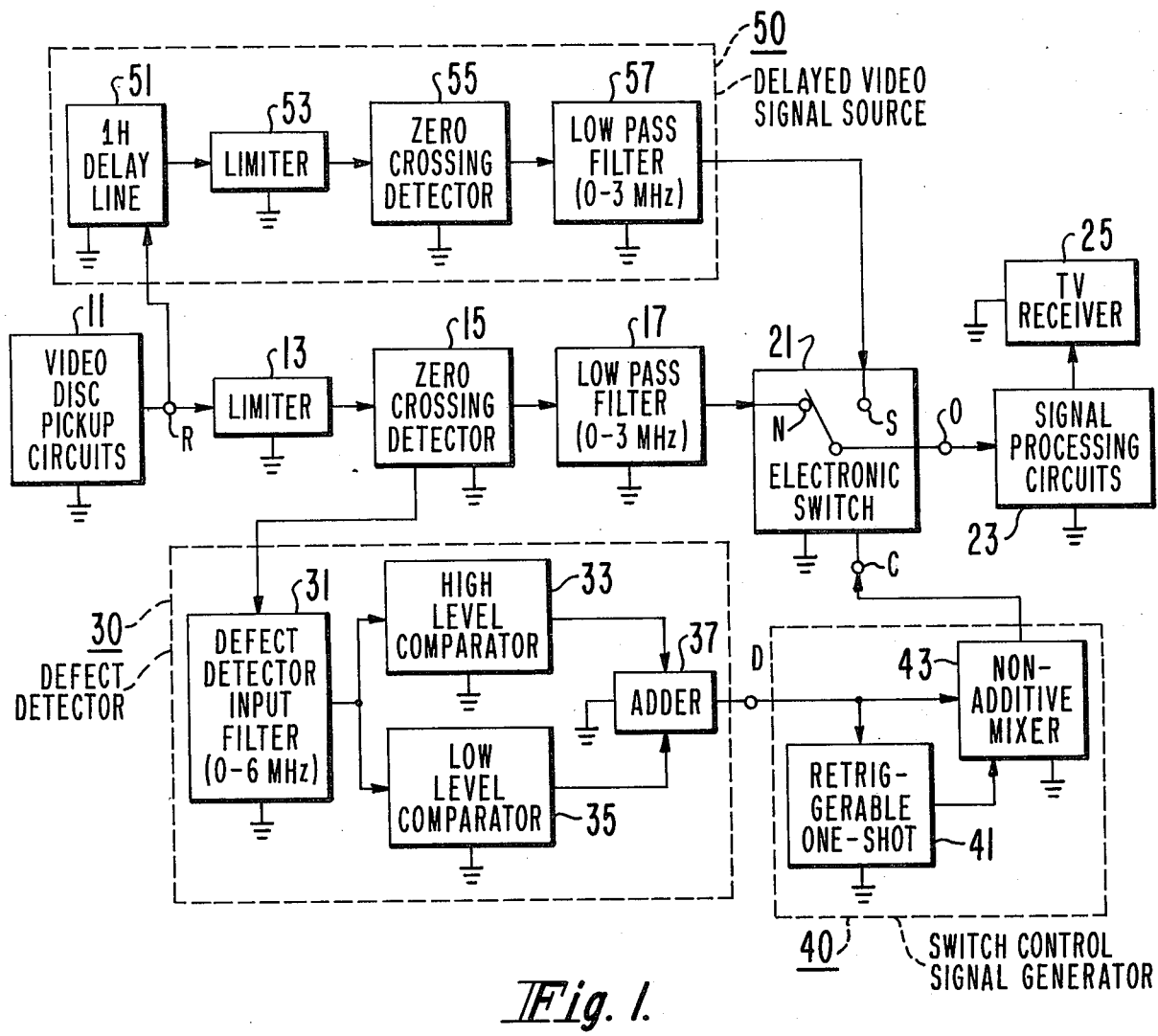
FIG. 1 illustrates, in block diagram form, a video disc player incorporating defect detection and compensation apparatus in accordance with an illustrative embodiment of the present invention.

In the video disc player apparatus of FIG. 1, an input FM signal for the player's signal processing circuits is developed at terminal R by video disc pickup circuits 11. Illustratively, the video disc pickup system is of the capacitive type previously described, and the structure and circuit arrangement of the video disc pickup circuits 11 may be generally as described in the aforementioned Clemens application. It is assumed that the recording format for the disc to be played is such that the recovered signal information appears at terminal R as a frequency modulated carrier, the instantaneous carrier frequency deviating within fixed deviation range limits (e.g., 3.9 – 6.5 MHz.) in accordance with the amplitude of a video signal occupying a band of frequencies (e.g., 0–3.0 MHz.) below the deviation range, and representative of a succession of images to be displayed.

The input FM signal at terminal R is supplied via a limiter 13 (serving the conventional purpose of removing or reducing spurious amplitude modulation of the input FM signal) to a zero-crossing detector 15. The zero-crossing detector 15 may comprise circuits of well-known type for developing an output pulse of a fixed amplitude, width and polarity in response to each zero-crossing of the limited input FM signal. The pulse output of the zero-crossing detector 15 is supplied to an output filtering system, illustrated as comprising, a lowpass filter 17. The passband of lowpass filter 17 substantially matches the band (e.g., 0–3 MHz.) occupied by the recorded video signal information.

The zero-crossing detector 15 and its output filtering system (17) form an FM detector of a so-called pulse counter type, providing an output in the form of a video signal corresponding to the modulation of the input FM signal. This video signal is supplied to the "normal" signal input terminal N of electronic switching apparatus 21. The electronic switching apparatus 21 serves the purpose of alternatively: (1) coupling the signal appearing at the "normal" signal input terminal N to the switching apparatus output terminal 0; or (2) coupling the signal appearing at a "substitution" signal input terminal S to the switching apparatus output terminal 0. Switching between the respective "normal" and "substitution" states is effected by control signals supplied to a control signal input terminal C (from apparatus to be subsequently described).

Under normal operating conditions, switching apparatus 21 couples the video signals appearing at terminal N to output terminal 0 for delivery to signal processing circuits 23, where the video signals are processed to a form suitable for applications to a television receiver 25. The processing circuits 23 may include, for example, suitable video frequency de-emphasis circuitry providing a frequency characteristic complementary to that employed for pre-emphasis in the recording operation.

Television receiver 25 serves to display a succession of images representative of the recorded signal information. However, as previously discussed, at randomly occurring intervals during the playback of a disc record, defects may appear in the input FM signal that will affect the video signal delivered to terminal N in a manner that would lead to display by receiver 25 of picture defects of the aforementioned black/white streak and spot type, if the receiver remains responsive to the signals at terminal N. To avoid such picture defect display, the player of FIG. 1 incorporates a defect detection and compensation system in accordance with the principles of the present invention. The system involves use of: (1) a delayed signal source 50, responsive to the input FM signal at terminal R and serving to develop a delayed video signal for delivery to the "substitution" signal input terminal S of switching apparatus 21; (2) a defect detector 30, responsive to the output of zero-crossing detector 15 and serving to develop a pulse output indicative of defect occurrences in the input FM signal; and (3) a switch control signal generator 40, responsive to the defect indication pulse output of defect detector 30 serving to develop a control signal for application to the control signal input terminal C of switching apparatus 21 to determine the switching state thereof.

The defect detector 30 includes a defect detector input filter 31 to which the pulse output of zero-crossing detector 15 is applied. Input filter 31 comprises a lowpass filter having a passband (e.g., 0–6 MHz.) appreciably wider than the passband of lowpass filter 17, thus being capable of passing signal components at frequencies significantly higher than the cutoff frequency of filter 17. The filter 31 is capable of passing DC, and provides no de-emphasis characteristic within its passband.

Also included in the defect detector 30 are a pair of voltage level comparators: high level comparator 33 and low level comparator 35. Each of the comparators is responsive to the wideband output of filter 31. High level comparator 33 serves to compare the instantaneous signal voltage level at the output of filter 31 with a preset comparison maximum voltage, and to develop an output pulse of a given polarity whenever the instantaneous level of the output of filter 31 exceeds the comparison maximum (the output pulse duration corresponding to the length of time during which the filter output level remains above the preset maximum level). The low level comparator 35 serves to compare the instantaneous output voltage level of the output of filter 31 with a preset comparison minimum voltage, and to develop an output pulse of said given polarity whenever the instantaneous level of the filter output falls below the comparison minimum (the output pulse duration corresponding to the length of time during which the filter output level remains below the preset minimum level).

Also included in the defect detector 30 is an adder 37 which combines the pulse outputs of the comparators 33, 35 to develop a defect indication pulse output at output terminal D. The switch control signal generator 40 includes a retriggerable one-shot 41 for generating pulses of a fixed duration in response to defect indication pulses appearing at terminal D. The switch control signal generator 40 also includes a non-additive mixer 43, serving to combine the pulse output of the one-shot 41 with the defect indication pulses from terminal D (in "or gate" fashion) to develop a switch control signal for application to terminal C of switching apparatus 21. The response of switching apparatus 21 to the switch control signal is poled such that the apparatus is switched to the "substitution" state only during the occurences of the output pulses of adder 37 and one-shot 41.

The delayed signal source 50 includes a 1-H delay line 51 (providng a signal delay corresponding to a period at the line scanning frequency of the video signal display system) to which the input FM signal at terminal R is applied. The delay line output is supplied via a limiter 53 to a zero-crossing detector 55, substantially matched in structure and adjustment to the zero-crossing detector 15. The zero-crossing detector 55 output is applied to an output filtering system comprising a lowpass filter 57 (with a characteristic substantially matching the characteristic of lowpass filter 17). The filtering system output is applied to the "substitution" signal input terminal S of switching apparatus 21, and constitutes a delayed video signal, lagging the video signal at the "normal" input terminal N by one line interval.

Figure 2:
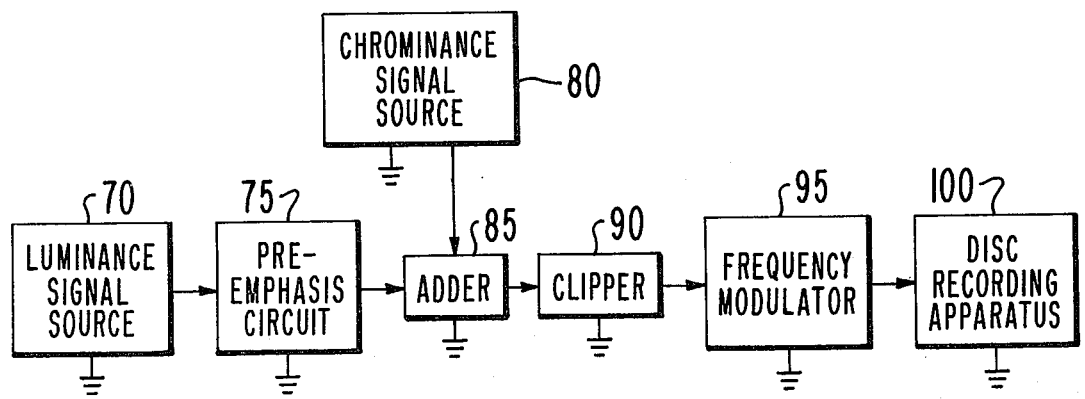
FIG. 2 illustrates, in block diagram form, recording apparatus suitable for use in the mastering of discs for playback in the apparatus of FIG. 1.

Before proceeding to a detailed description of the operation of the above-outlined defect detection and compensation system, it will be helpful to consider an illustrative process for forming the recorded FM signal which is recovered by the playback apparatus of FIG. 1. FIG. 2 is illustrative of one suitable form of recording apparatus that may be employed in preparing a master recording from which a replica disc may be derived for use in the FIG. 1 player.

In the FIG. 2 arrangement, a composite video signal representative of the luminance of a succession of images (and accompanying deflection synchronizing components) is developed by a luminance signal source 70. A signal representative of the chrominance of the images, and illustratively in the form of a phase and amplitude modulated subcarrier, is developed by a chrominance signal source 80. The output of luminance signal source 70 (illustratively occupying a 0–3 MHz. band) is supplied, via a pre-emphasis circuit 75, to an adder 85 for combination with the chrominance signal output of source 80 to form a composite color video signal. The pre-emphasis circuit 75 provides a rising response with increase in frequency over a selected upper portion of the band occupied by the luminance signal.

The composite signal output of adder 85 is applied via a clipper 90 to a frequency modulator 95 in which the instantaneous frequency of carrier oscillations is varied in accordance with the amplitude of the clipped composite signal provided by clipper 90. The clipping levels in clipper 90 are chosen to restrict the carrier frequency variations to frequencies within an appropriate deviation range (e.g., 3.9–6.5 MHz.). The FM signal output of modulator 95 is supplied as a recording signal input to video disc recording apparatus 100. The latter apparatus is illustratively of the electron beam recording type disclosed in the aforesaid Clemens application, providing signal controlled exposure of a master recording disc (from which replica discs can be obtained in accordance with replicating processes described in said Clemens application). It should be noted that, as discussed in said Clemens application, where sensitivity limitations of the electron beam sensitive material employed in apparatus 100 dictate use of a slower-than-real-time recording process, the recording disc rotation rate will be slower than the intended disc playback rotation rate. Under these circumstances, the actual frequencies, deviation range, etc., employed in the recording signal will be appropriately scaled down relative to the frequencies, deviation range, etc., desired to be obtained upon playback.

Returning to a consideration of the operation of the playback apparatus of FIG. 1, it will be appreciated that the effect of desired picture information on the signal developed at terminal R by pickup circuits 11 during disc playback is confined to shifts of the instantaneous carrier frequency within a range of known, fixed limits (e.g., between a maximum $f_{max}$ of 6.5 MHz. and a minimum $f_{min}$ of 3.9 MHz.). This fact is relied upon in the approach of the present invention to the defect detection/compensation problem, in that departures of the instantaneous frequency of the terminal R signal to values above $f_{max}$ or below $f_{min}$ are considered as signalling the occurrence of a defect for which compensation should be effected.

In the FIG. 1 arrangement, the zero-crossing detector 15 responds to a limited version of the terminal R signal delivered by limiter 13 by developing an output pulse of a given polarity, and of a substantially fixed amplitude and width, upon each zero-crossing occurrence in the limited signal. Filtering of the output pulses of detector 15 in the defect detector input filter 31 develops a signal, the instantaneous amplitude of which is substantially linearly proportional to the instantaneous frequency of the limited signal input to the zero-crossing detector 15. Instantaneous detector input frequency variations between $f_{max}$ and $f_{min}$ will result in variations in the instantaneous amplitude of the filter output between substantially fixed voltage limits ($V_{max}$ and $V_{min}$). Should the instantaneous frequency of the input to detector 15 shift above $f_{max}$, however, the instantaneous amplitude of the output of filter 31 will rise above $V_{max}$; conversely, should the instantaneous frequency of the detector input fall below $f_{min}$, the instantaneous amplitude of the filter output will drop below $V_{min}$.

The comparators 33 and 35 serve to identify those occassions when the instantaneous amplitude of the output of filter 31 departs from the $V_{max}$ to $V_{min}$ range. High level comparator 33 provides a defect indication at its output for the duration of each excursion of the filter 31 output amplitude above a first comparison voltage level set in the immediate vicinity of $V_{max}$. Low level comparator 35 provides a defect indication of similar character at its output for the duration of each excursion of the filter 31 output amplitude below a second comparison voltage level set in the immediate vicinity of $V_{min}$. It is generally desirable to set said first and second comparison voltage levels slightly above $V_{max}$, and slightly below $V_{min}$, respectively, to ensure that actual extremes of the desired picture information do not result in defect indication (particularly in the face of the possibility of slight errors in the playback disc rotation speed that may slightly alter the effective deviation range of the desired signal). Inclusion of such a tolerance in the comparison level settings does not significantly detract from the accuracy of defect detection, since the troublesome defects sought to be detected typically involve a substantial departure in frequency from the $f_{max}$ to $f_{min}$ range. Adder 37 combines the outputs of both comparators to provide a single output indicating in common the departures in either direction from the $f_{max}$ to $f_{min}$ range.

The nature of most causes of the troublesome picture defects is generally such as to produce in the signal at terminal R a shift in the instantaneous frequency that is extremely abrupt relative to the carrier frequency shifts effected by the desired video signal modulation. The signal defect thus corresponds to a spurious modulation of the carrier by a signal having frequency components well above the highest frequency of the recorded video signal. By providing the defect detector input filter with a wideband response extending to a high frequency cutoff value (e.g., 6 MHz.) appreciably higher than the highest recorded video signal frequency (e.g., 3 MHz.), defect detection is enhanced in several important respects. The wideband response of filter 31 enables its output to closely follow the abrupt onset of a signal defect. That is, upon the occurrence of a signal defect, the excursion of the filter output past a comparison threshold may be effected with a short rise time, enabling an early initiation of a defect indication pulse. With an appropriately rapid response provided for the associated compensaton controlling device (e.g., electronic switching apparatus 21), the player can be shifted to a compensation mode of operation before the output of the (slower response) narrow band filtering system 17 has been significantly disturbed by the signal defect.

Preservation of the high frequency components of the defect modulation in the output of filter 31, moreover, enhances the magnitude of the defect onset voltage swing, aiding differentiation on an amplitude on an amplitude basis between defect and normal input levels to the comparators, and widening the range of acceptable settings for the comparison levels.

It may be noted that by virtue of the nature of the previously described operation of zero-crossing detector 15 (i.e., its development of an output pulse in response to each zero-crossing), the output pulses repeat at rates which are double the input signal frequencies. Thus, for example, desired input signal frequency variations over the illustrative deviation range of 3.9 – 6.5 MHz. result in output pulse repetition rates in the 7.8 – 13.0 MHz. Under these circumstances, one may readily extend the cutoff frequency of the defect detector filter 31 to (or somewhat beyond) the illustrative 6 MHz. value, and still provide desired carrier component rejection.

The wideband response of filter 31 also enables its output to closely follow a return of the input signal frequency to a within-range value, wherefore the termination of a defect indication pulse output of a comparator may precede the end of the related disturbance in the output of the slower-response filtering system 17. This could result in a premature return of the player to its normal operating mode, were the defect indication pulse output of adder 37 to be used, per se, as the control signal for switching apparatus 21. To avoid premature terminations of defect compensation, it is desirable to provide some means for effectively "stretching" the defect indication pulses to a termination time following the end of the related disturbance in the output of filtering system 17.

One illustrative manner of achieving such a "stretching" is provided in the switch control signal generator 40 of FIG. 1, in which the retriggerable one-shot 41 is included. The retriggerable one-shot 41 responds to the leading edge of each defect indication pulse to initiate generation of an output pulse, which has a substantially fixed duration (in the absence of retriggering during its generation). The output pulse duration is chosen to be sufficiently long (e.g., 2–3 microseconds) to encompass the time normally required for stabilization of the signal output of the filtering system 17 following termination of an input signal defect. The output pulses of retriggerable one-shot 41 are combined with the defect indication pulses from terminal D in a nonadditive mixer 43, providing in "or gate" fashion an output pulse of a given polarity and amplitude during the presence of either or both inputs.

In the instance of an isolated, short duration excursion of the filter 31 output beyond a comparator threshold, the output of generator 40 is stretched version of the resultant defect indication pulse, with a duration determined by the duration of the output pulse of one-shot 41. In the instance of a series of short excursions, spaced by intervals shorter than the one-shot output pulse duration, the output of generator 40 is a single, lengthened pulse, with the duration extending from the leading edge of the first resultant defect indication pulse to a time lagging the leading edge of the last of the series of resultant defect indication pulses by an interval corresponding to the one-shot's normal output pulse duration. In this latter instance, the retriggerable nature of the one-shot 41 provides an effective "filling-in" of the gaps appearing in the defect indication pulse series. In the instance where an isolated excursion of the filter 31 output beyond a comparator threshold lasts for a longer period than the normal output of oneshot 41, the presence of the defect indication pulses, themselves, as an input to the nonadditive mixer 43 ensures that the output of generator 40 endures beyond the one-shot output pulse termination to the termination of the long defect indication pulse.

In the copending application of Alfred L. Baker, entitled "Defect Compensation Switching Apparatus" and concurrently filed herewith, now U.S. Pat. No. 3,909,518, an alternative form of "stretching" means is disclosed which may readily be substituted for the one-shot/mixer apparatus 41, 43 in performing the function of the switch control signal generator. In the Baker arrangement, "stretching" is achieved by applying the defect indication pulses to an envelope detector employing a diode and a capacitor, with the diode poled for conduction to charge the capacitor in response to defect indication pulse appearance. A resistive load for the detector provides a capacitor discharge time constant which is tailored relative to the cutoff level for a succeeding transistor stage, so that the transistor conduction will be maintained throughout defect indication pulse appearance, and will not cease following defect indication pulse termination unless a capacitor discharge period of suitable time duration has concluded without appearance of a new defect indication pulse. The Baker arrangement will be seen to provide, in the transistor stage output, not only the previously described effects of "stretching" short defect indication pulses, and "filling in" series of short defect indication pulses, but also the effect of "stretching" even long duration defect indication pulses.

While a variety of well-known structures may be feasibly employed for performing the function of the electronic switch 21 in responding to the control signal output of generator 40, reference may be made to the aforementioned copending Baker application for a schematic illustration and detailed description of particularly advantageous structure therefor. Also disclosed in said Baker application is a particular arrangement that may desirably be employed to perform the functions of comparators 33, 35 and adder 37, with the active devices for achieving these functions associated on a single integrated circuit chip ($\mu$A711C).

In the particular arrangement illustrated for the delayed video signal source 50 in FIG. 1, signal information traverses the 1H delay line 51 while in FM signal form. While this facilitates the use of an ultrasonic delay line for the 1H delay function, without necessitating provision of auxiliary carrier modulation and demodulation apparatus to accommodate the bandpass character of such delay lines, the illustrated arrangement has the drawback of requiring a second FM detector (53, 55, 57) to translate the delayed signal to video signal form.

In the application, Ser. No. 476,839, of John G. Amery, concurrently filed the parent hereof, and abandoned in favor of the continuation-in-part application, Ser No. 568,313 (now issued as U.S. Pat. No. 3,969,759), an alternative form for the delayed video signal source is disclosed which does not require FM detector duplication. In the Amery arrangement, a 1H delay line, which is provided in the signal processing circuits (23) following the switch (21) for comb filter purposes, performs double duty by also providing the line storage desired for defect compensation purposes. By deriving the "substitution" signal from the output of this delay line, an advantage of recirculation of non-defective information is obtained which enables reasonable compensation of lengthy defects that extend for a duration exceeding one line interval. It will be appreciated that the advantageous form of delayed video signal source shown in the Amery application may be substituted for the FIG. 1 arrangement thereof in practice of the present invention.

Where the recorded video signal information includes a chrominance component (as suggested in the discussion of the FIG. 2 apparatus), its form may require special considerations in the realization of the delayed video signal source. Reference may be made to the aforesaid Amery application for problem solutions appropriate for use where the chrominance component of the recorded signal is in the "buried subcarrier" format disclosed in the application of Dalton H. Pitchard, Ser. No. 350,777, now U.S. Pat. No. 3,872,498. In such a format (as well as others) where preservation of an interlace character of the subcarrier is desirable, inclusion of means in the delayed video signal source for altering the phasing of the chrominance component output may be appropriate, as more fully explained in said copending Amery application.

While the present invention has been described above in the context of defect detection and compensation in the playback of a particular form of video disc, it will be appreciated that various features of the invention may have wider applicability to other forms of record playback or signalling systems where defects in a recovered FM signal require detection and compensation.

What is claimed is:

1. In a signal translating system including a source of carrier waves the instantaneous frequency of which is subject to variation over a given deviation range in accordance with the amplitude of a desired signal of a given bandwidth, said source being randomly subject to occasions of defective operation during which the apparent instantaneous frequency of said carrier waves departs from said given deviation range; frequency modulation detecting means coupled to said source, said detecting means including a zero-crossing detector, and a low pass filter, coupled to said zero-crossing detector and having a passband substantially limited to said given bandwidth, for providing a demodulated signal having an amplitude normally corresponding to the amplitude of said desired signal but subject to spurious amplitude variations during said occasions of defective operation; signal utilization means; and means for normally supplying the demodulated signal output of said low pass filter to said signal utilization means; a defect detection and compensation system comprising, in combination:

means coupled to said zero-crossing detector for deriving an output signal having an instantaneous amplitude which varies within a range of levels between first and second amplitude levels in response to variations of said instantaneous frequency within said given deviation range, and which departs from said range of levels in response to departures of said instantaneous frequency from said given deviation range;

voltage level comparison means responsive to the output signal provided by said deriving means for developing impulses in response to departures of said output signal from said range of levels; and means responsive to the impulses developed by said voltage level comparison means for disabling said demodulated signal supplying means.

2. Apparatus in accordance with claim 1 also including a delayed signal source and normally disabled means for supplying signals from said delayed signal source to said signal utilization means, and wherein said disabling means also serves to enable said normally disabled signal supplying means.

3. In a signal translating system including a source of carrier waves the instantaneous frequency of which is subject to variation over a given deviation range in accordance with the amplitude of a desired signal of a given bandwidth, said source being randomly subject to occasions of defective operation during which the apparent instantaneous frequency of said carrier waves departs from said given deviation range; frequency modulation detecting means coupled to said source, said detecting means including a low pass filter having a passband substantially limited to said given bandwidth for providing a demodulated signal having an amplitude normally corresponding to the amplitude of said desired signal but subject to spurious amplitude variations during said occasions of defective operation; signal utilization means; and means for normally supplying the demodulated signal output of said low pass filter to said signal utilization means; a defect detection and compensation system comprising, in combination:

means for deriving from said frequency modulation detecting means an output signal having an instantaneous amplitude which varies within a range of levels between first and second amplitude levels in response to variations of said instantaneous frequency within said given deviation range, and which departs from said range of levels in response to departures of said instantaneous frequency from said given deviation range;

voltage level comparison means responsive to the output signal provided by said deriving means for developing impulses in response to departures of said output signal from said range of levels; and means responsive to the impulses developed by said voltage level comparison means for disabling said demodulated signal supplying means;

wherein said frequency modulation detecting means includes means for generating pulses of relatively fixed amplitude and width in response to the zero-crossings of the waves supplied by said source;

wherein said low pass filter is responsive to the output of said pulse generating means; and wherein said output signal deriving means comprises a second low pass filter responsive to the output of said pulse generating means, said second low pass filter having a passband appreciably exceeding said given bandwidth.

4. Apparatus in accordance with claim 3 wherein said disabling means includes means for effectively stretching the duration of at least some of said impulses developed by said voltage level comparison means.

5. In a system for playback of a record of successive images, said system including pickup means for recovering from said record carrier waves having an instantaneous frequency which is subject to variation over a given deviation range in accordance with the amplitude of an image-representative video signal of a given bandwidth, there being random occasions during the recovery of said video signal when the apparent instantaneous frequency of said carrier waves departs from said given deviation range; frequency modulation detecting means coupled to said pickup means, said detecting means including (1) a zero-crossing detector, and (2) a low pass filter, coupled to said zero-crossing detector and having a passband substantially limited to said given video signal bandwidth, for providing a demodulated signal having an amplitude normally corresponding to the amplitude of said video signal but subject to spurious amplitude variations during said occasions of carrier wave frequency departure from said given deviation range; image display means; and means for normally supplying the demodulated signal output of said low pass filter to said image display means; an image defect detection and compensation system comprising, in combination:

means coupled to said zero-crossing detector for deriving an output signal having an instantaneous amplitude which varies within a range of levels between first and second amplitude levels in response to variations of said instantaneous frequency within said given deviation range, and which departs from said range of levels in response to departures of said instantaneous frequency from said given deviation range;

voltage level comparison means responsive to the output signal provided by said deriving means for developing a defection indication signal in response to departures of said output signal from said range of levels; and means for responsive to said defect indication signal for disabling said demodulation signal supplying means.

6. Apparatus in accordance with claim 5
wherein zero-crossing detector develops pulses of relatively fixed amplitude and width in response to the zero-crossings of the wave output of said pickup means, said zero-crossing representative pulses being supplied to said low pass filter; and wherein said output signal deriving means comprises a second low pass filter coupled to said zero-crossing detector and having a passband appreciably wider than the passband of said first-named low pass filter.

7. Apparatus in accordance with claim 6 also including:

a source of video signals recovered from said record and lagging the output of said first-named low pass filter by a time interval of sufficient length that said lagging video signals are representative of information from an image line preceding the image line for which the output of said first-named low pass filter is representative;

normally disabled means for supplying the output of said source of lagging video signals to said image display means; and means responsive to said defect indication signal for enabling said normally disabled lagging video signal supplying means when said demodulated signal supplying means is disabled.

8. Apparatus in accordance with claim 7 wherein said defect indication signal developing means includes pulse stretching means for enabling defect indication signal development subsequent to a return of said output signal to said range of levels.

9. In a video disc player including pickup circuits for developing during playback of a video disc record on FM signal having an instantaneous frequency subject to variation over a given deviation range in accordance with the amplitude of recorded video signals occupying a given frequency band, the combination comprising:

a zero-crossing detector coupled to said pickup circuits and responsive to said FM signal;

a first low pass filter having a passband substantially matching said given video signal frequency band, and coupled to receive the output of said zero-crossing detector;

a second low pass filter having a cutoff frequency substantially higher than the highest video signal frequency in said given frequency band, and coupled to receive the output of said zero-crossing detector;

means for utilizing the output of said first low pass filter to control the display of images; and means responsive to departures of the instantaneous amplitude of the output of said second low pass filter from a predetermined range of amplitude levels for altering the mode of operation of said output utilizing means.

10. Apparatus in accordance with claim 9 wherein said operation mode altering means includes respective means for comparing said instantaneous amplitude with respective amplitude levels representative of the level of the output of said second low pass filter obtained when said zero-crossing detector responds to an input at respective frequencies substantially corresponding to the limits of said given deviation range.

11. In a system for playback of a record of successive images, said system including pickup means for recovering from said record carrier waves having an instantaneous frequency which is subject to variation over a given deviation range in accordance with the amplitude of an image-representative video signal of a given bandwidth, there being random occasions during playback when the instantaneous frequency of the wave output of said pickup means departs from said given deviation range; frequency modulation detecting means coupled to said pickup means, said detecting means including a zero-crossing detector, and a low pass filter, coupled to said zero-crossing detector and having a passband substantially limited to said given video signal bandwidth, for providing a demodulated signal having an amplitude normally corresponding to the amplitude of said video signal but subject to spurious amplitude variations during said occasions of output wave frequency departure from said given deviation range; output signal developing means; and means for normally supplying the demodulated signal output of said low pass filter to said output signal developing means; an image defect detection and compensation system comprising, in combination:

first means coupled to said zero-crossing detector for developing an impuse when the instantaneous frequency of the wave output of said pickup means falls in a band of frequencies above said given deviation range;

second means coupled to said zero-crossing detector for developing an impulse when the instantaneous frequency of the wave output of said pickup means falls in a band of frequencies below said deviation range;

means, including an adder responsive to the outputs of said first and second impulse developing means, for developing a defect indication signal indicative of departures of said instantaneus frequency from said given deviation range; and means responsive to said defect indication signal for disabling said demodulated signal supplying means.

12. Apparatus in accordance with claim 11 also including a delayed signal source and normally disabled means for supplying signals from said delayed signal source to said output signal developing means, and wherein said disabling means also serves to enable said normally disabled signal supplying means.

13. Apparatus in accordance with claim 11 also including:

a source of video signals recovered from said record and lagging the output of said low pass filter by a time interval of sufficient length that said lagging video signals are representative of information from an image line preceding the image lime for which the output of said low pass filter is representative;

normally disabled means for supplying the output of said source of lagging video signals to said output signal developing means; and means responsive to said defect indication signal for enabling said normally disabled lagging video signal supplying means when said demodulated signal supplying means is disabled.

14. Apparatus in accordance with claim 13 wherein said defect indication signal developing means also includes pulse stretching means responsive to the output of said adder for enabling defect indication signal development to persist beyond impulse termination.

* * * * *